(12) United States Patent
Plenderleith et al.

(10) Patent No.: US 10,764,214 B1
(45) Date of Patent: Sep. 1, 2020

(54) ERROR SOURCE IDENTIFICATION IN CUT-THROUGH NETWORKS

(71) Applicant: Amazon Technologies, Inc., Seattle, WA (US)

(72) Inventors: Jamie Plenderleith, Dublin (IE); Marios Dimitriou, Dublin (IE); Donagh Edward Hatton, Kildare (IE); Michael Achola, Dublin (IE); Marco Losito, Dublin (IE); Edouard Stephane Gilles Marie Vincent, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 16/219,338

(22) Filed: Dec. 13, 2018

(51) Int. Cl.
| | |
|---|---|
| H04L 12/939 | (2013.01) |
| H04L 12/947 | (2013.01) |
| H04L 12/26 | (2006.01) |
| H04L 12/24 | (2006.01) |
| H04L 1/00 | (2006.01) |
| H04L 12/751 | (2013.01) |

(52) U.S. Cl.
CPC .......... *H04L 49/555* (2013.01); *H04L 1/0061* (2013.01); *H04L 41/0213* (2013.01); *H04L 41/064* (2013.01); *H04L 41/069* (2013.01); *H04L 43/0847* (2013.01); *H04L 45/02* (2013.01); *H04L 49/251* (2013.01)

(58) Field of Classification Search
None
See application file for complete search history.

(56) References Cited

U.S. PATENT DOCUMENTS 5,261,044 A * 11/1993 Dev ............... G06F 11/2257
709/223
9,009,542 B1 * 4/2015 Marr .............. G06F 11/3055
714/47.1

OTHER PUBLICATIONS

U.S. Appl. No. 14/867,468, filed Sep. 28, 2015, Achola.

* cited by examiner

*Primary Examiner* — Alex Skripnikov
(74) *Attorney, Agent, or Firm* — Klarquist Sparkman, LLP

(57) ABSTRACT

Technologies are provided for identifying a source of errors within a computer network that uses cut-through forwarding of network packets. For example, inbound network packets can be received by network devices configured to perform cut-through forwarding. Once the network packets are received, they are processed using cut-through forwarding. If any packet errors are detected, error data associated with the detected errors are stored by the network devices. The error data is transmitted to a monitoring service that uses the error data to create a model of a flow of the errors through the network and to identify a source of the errors. In at least some embodiments, a topology of the network is used by the monitoring service to create the model of the packet error flow.

18 Claims, 8 Drawing Sheets

ERROR SOURCE IDENTIFICATION IN CUT-THROUGH NETWORKS

BACKGROUND

In order to communicate network traffic between a source device and a destination device, packet forwarding networks forward packets between network devices, such as routers and switches, along the path between the source and the destination. In some computer networks, network devices implement various forwarding strategies, which can include store-and-forward and cut-through forwarding. With store-and-forward, the entire network packet is received before it is forwarded on. With cut-through forwarding, the network device does not have to wait for the entire packet to be received before beginning to forward it on to the next network device.

While cut-through forwarding can reduce the latency of network packets being transmitted through the computer network, cut-through forwarding has some drawbacks. For example, with cut-through forwarding corrupted network packets can be transmitted across a number of network devices before the problem is discovered. In addition, it may be difficult to identify the source of the network packet corruption because the network packets have already been forwarded when the network packet corruption is detected.

DETAILED DESCRIPTION

Figure 1:
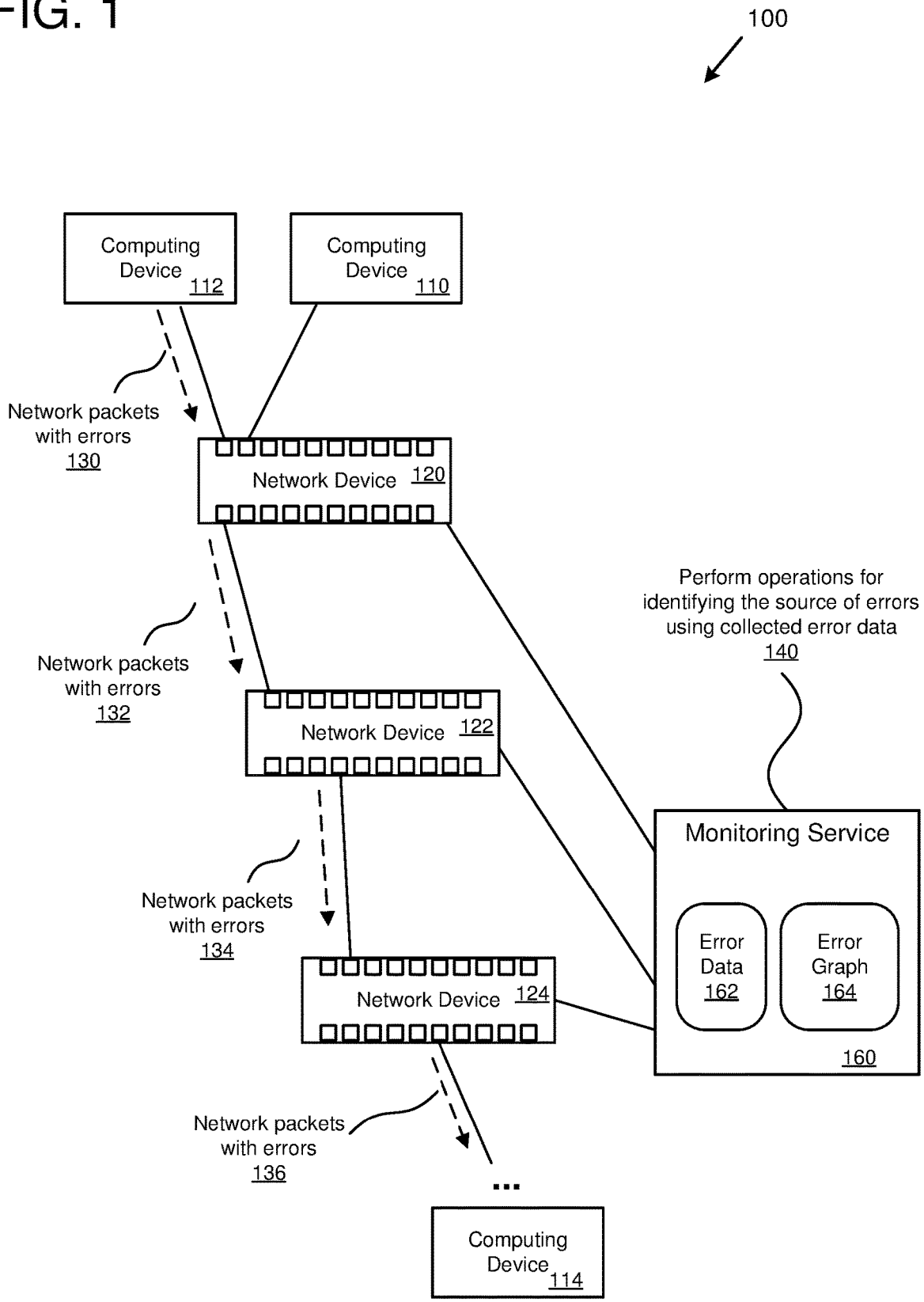
FIG. 1 is a system diagram depicting an example system comprising a monitoring service that performs operations for identifying a source of errors in a cut-through network.

The following description is directed to technologies for identifying the source of errors within a computer network that uses cut-through forwarding of network packets. For example, inbound network packets can be received by a network device (e.g., a router or switch) that is configured to perform cut-through forwarding of the network packets it receives. Once the network packets are received by the network device, they are processed using cut-through forwarding (e.g., they are forwarded on to the next network device, or final destination, using cut-through forwarding).

Network devices generally use two types of forwarding strategies for network packets (also sometimes called "frames" herein): store-and-forward and cut-through forwarding. With store-and-forward network packet processing, the entire network packet is received before it is forwarded on to the next hop or destination computing device. With cut-through forwarding, the network packet is forwarded as it is received. Cut-through forwarding provides a reduction in latency when compared to store-and-forward because the network device does not have to wait until the entire packet has been received before forwarding it on to the next network device or destination computing device. For example, a network device receiving a network packet can examine the packet header and begin forwarding the network packet to the next hop along the path to the ultimate destination as the network packet is being received (i.e., before the whole network packet has been received by the network device). For example, after receiving a sufficient number of bits of the packet's header to determine an outbound port for the packet (e.g., by using a destination address field in the packet header to look up a next-hop for the packet), the network device begins transmitting the packet bits via the outbound port without first waiting to receive all of the packet bits and validate the packet. Other network devices along the path can do the same thing.

With store-and-forward processing, detecting errors can be straightforward because the network packets are received and evaluated before the network packets are forwarded on (for example, by using a cyclic redundancy (CRC) check to evaluate the integrity of a network packet's contents). In a computer network, a CRC error can be identified using a CRC value stored in a CRC field (called the frame check sequence field) in an Ethernet frame portion of a network packet. A CRC error indicates that some data within the network packet is corrupted. Corruption of network packet data can be caused by, for example, a failing network interface of a server or network device, a network cable problem (e.g., a loose optical or electrical connection), or an environmental factor (e.g., vibration or heat). In some implementations, other types of network packet errors (also called packet errors) can be monitored and used (e.g., separately or in combination with CRC errors) for identifying source devices that originated such errors. For example, forward error correction errors, framing errors, and/or header checksum errors can be used.

With a store-and-forward strategy, if a given network packet fails its CRC check, then that network packet can be discarded and not forwarded. With cut-through forwarding, however, the network device will not know if there is an error with the packet until the entire packet has been received because the CRC field is located at or near the end of the packet (after the packet payload data). Therefore, when cut-through forwarding is being used, the network devices (e.g., five, ten, or more network devices) along the path of a network packet with an error will each experience an error with that network packet. As a result, networks using cut-through forwarding will report more errors because network packets with errors can be propagated across many devices of the network. In addition, it can be difficult to isolate the source of the errors in a cut-through network. For example, a network device that is processing network packets using cut-through forwarding will not detect CRC errors until the end of the packet is reached, at which point the entire packet will no longer be available at the network device (e.g., the network device will not have the network packet header to check for the source IP address).

At least some of the embodiments of the technologies described herein solve these problems by receiving network packet error data from the network devices at an external monitoring server, and using the error data from the plurality of network devices to identify a source of the errors. For example, the network devices can track metrics about detected errors (such as inbound and outbound error counts). A monitoring service can be configured to retrieve the error metrics from the network devices and use the error metrics to create a graph which models a flow of the errors through the cut-through network. The monitoring service can then use the graph to identify a device and/or communication link that is the source of the errors.

In a different or further embodiment, a topology of the cut-through network can be used to identify the source of the errors. For example, a monitoring service can use counts of detected errors received from the network device in the cut-through network to identify a plurality of the network devices that have experienced increases in corrupted network packets. The monitoring service can use the network topology to identify one or more possible paths connecting the plurality of network devices which the corrupted network packets may have traveled. The monitoring service can use the one or more possible paths to identify a potential source of the corrupted network packets.

FIG. 1 is a system diagram depicting an example system 100 comprising a monitoring service 160 that performs operations for identifying a source of errors in a cut-through network. FIG. 1 is a simplified diagram that only depicts a few devices and network connections for ease of illustration. A real-world computing environment may contain many more computing devices, network devices, network connections and network fabrics, and other computing resources.

In FIG. 1, three example computing devices 110, 112, and 114 are depicted. For example, the computing devices 110, 112, and 114 can be server computers (e.g., running virtual machine instances) or other types of computing devices (e.g., desktop or laptop computers). Three example network devices 120, 122, and 124 are also depicted. For example, the network devices 120, 122, and 124 can be switches, routers, or other types of networking equipment that process network packets. The network devices 120, 122, and 124 can be part of a larger network of a business or organization (e.g., part of a data center network that can comprise network fabrics, such as multi-tiered network fabrics). The network devices 120, 122, and 124 each have a number of network ports for connecting to computing devices or other network devices. In FIG. 1, a number of example network links are depicted. Specifically, computing devices 110 and 112 are connected to network device 120. For example, computing devices 110 and 112 may have network interfaces (e.g., gigabit Ethernet network interfaces) connected to wired Ethernet cables (or using another physical network technology, such as token ring) that connects to network ports of network device 120. Network device 120 is connected to network device 122. Network device 122 is connected to network device 124. Network device 124 is ultimately connected (by some intermediary network devices such as one or more switches or routers, which are not depicted) to computing device 114.

FIG. 1 depicts an example flow of network packets (e.g., Internet Protocol (IP) network packets operating over Ethernet) from computing device 112 (which is the source of the network packets in this example) to computing device 114 (which is the destination of the network packets in this example). The computing device 112 sends the network packets over the network link that is connected to a first network port of network device 120 (the network port of network device 120 that is connected to computing device 112 is called a "first" network port for ease of identification in this example). In order for the network packets to reach the destination computing device 114, the network device 120 transmits the network packets via a second network port of network device 120, which is connected to a first network port of network device 122. Network device 122, in turn, transmits the network packets via a second network port to a first network port of network device 124. The network packets are received and transmitted in this way until they are received at the destination computing device 114.

Network devices 120, 122, and 124 can process network packets using cut-through forwarding (e.g., cut-through forwarding is enabled on all network ports of network devices 120, 122, and 124). Therefore, network device 120 will begin transmitting a network packet it receives from computing device 112 to network device 122 before the complete network packet has been received by network device 120. Network device 122 will do the same thing, as will network device 124.

In FIG. 1, the network packets being transmitted from computing device 112 to computing device 114 are experiencing errors, as depicted at 130. For example, the network cable connecting computing device 112 to network device 120 may have a problem, which is introducing corruption in the packet data. Such corruption in a packet can be detected by using a cyclic redundancy check (CRC) encoded in the packet. An error detected using a CRC can be referred to as a CRC error. Network device 120 can record CRC errors, but not until network device 120 has completed reception of a given network packet and checked its CRC value. However, due to cut-through forwarding, the given network packet will have already traversed network devices 122 and 124, thereby causing errors to be reported at those network devices as well (as depicted at 132, 134, and 136, the network packets being transmitted will also have errors). While FIG. 1 depicts the source of the errors as the computing device 112, or the link between the computing device 112 and the network device 120, in general errors can be introduced by computing devices, network devices, and/or network links. For example, network device 120 or 122, or the link between them, could be the source of errors in a different scenario.

As depicted at 140, the monitoring service 160 can perform operations for identifying the source of errors using error data 162 collected from the network devices 120, 122, and 124. For example, network device 120 can receive inbound network packets from its inbound network ports (including inbound network packets from computing devices 110 and 112). Network device 120 can process the received packets and transfer the network packets on outbound network ports using cut-through forwarding. If network device 120 detects an error in a received network packet (for example by performing a CRC check after the last of the packet has been received), then network device 120 can store error data associated with the detected error. Example error data includes a count of errors detected in inbound network packets and a count of errors detected in outbound network packets. In at least some embodiments, error counts can be tracked on a per-port basis. As the network packets are received by network devices 122 and 124, those network devices can process and transfer the received packets using cut-through forwarding and store error data associated with any errors they detect as well.

The monitoring service 160 can retrieve the error data 162 associated with the detected errors from network devices 120, 122, and 124. The monitoring service 160 can comprise one or more hardware and/or software components of one or more computing devices, such as server computers (e.g., running virtual machine instances) or other types of computing devices. The monitoring service can be configured to retrieve the error data from the network devices via a computer network. For example, the monitoring service can be connected to the network devices 120, 122, and 124 via a management plane of a local area network. Using a management plane, communication between the network devices and the management service 160 can be transmitted via a set of physical and/or logical connections that is separate from a set of connections used by the network devices to route network packets through the network. In at least some embodiments, the monitoring service 160 retrieves the error data from the network devices using a network management protocol, such as a simple network management protocol (SNMP).

In at least one embodiment, the monitoring service 160 can be hosted at a location that is external to the cut-through network. For example, the monitoring service 160 can comprise an externally-accessible application programming interface (API) that can be used by applications and/or network administrators to identify the source of the errors in the cut-through network. In such a configuration, rather than the monitoring service 160 receiving the error data via connections to the network devices, the error data can be retrieved by an application, or a network administrator, and uploaded to the monitoring service 160. The monitoring service 160 can provide an identity of the source of the errors in response. Optionally, the application, or network administrator, can provide a topology of the cut-through network to the monitoring service 160 to aid in the error source identification.

The error data collected from the network devices 120, 122, and 124 can comprise counts of errors detected at the respective network devices. The errors detected by a network device can include errors detected in network packets received at one or more inbound network ports of the network device and/or errors detected in network packet data transmitted at one or more outbound network ports of the network device. Storing the error data by the network device can comprise storing a count of the errors in the network packet data received at the one or more inbound network ports and/or storing a count of the errors in the network packet data transmitted at the one or more outbound ports of the network device. For example, each of the network devices 120, 122, and 124 can store counts of CRC errors detected in inbound network packets and counts of CRC errors detected in outbound network packets. In at least some embodiments, the network devices 120, 122, and 124 can track separate error counts The monitoring service 160 uses the retrieved error data 162 to create an error graph 164 that models a flow of the detected errors through the cut-through network. The error graph 164 can be a directed acyclic graph. The error graph 164 can comprise nodes representing the network devices 120, 122, and 124 that detected errors, and directed edges between the nodes that represent transmissions of network packets containing the errors from one network device to another network device.

The monitoring service 160 uses the error graph 164 to identify a source device that originated the network packets containing the errors. For example, in the scenario depicted in FIG. 1, the monitoring service 160 can traverse the error graph 164 to determine that the network device 120 is the first network device to receive the network packets containing the errors. In an embodiment where the error data comprises error counts associated with specific ports of the network devices, the monitoring service 160 can determine that the network device 120 received the network packets containing the errors via an inbound network port connected to the computing device 112. The monitoring service 160 can determine that the computing device 112, or the connection from the computing device 112 to the network device 120, is the source of the errors.

In at least some embodiments, retrieving the error data comprises retrieving error data from the network devices at specified time intervals over a period of time. In such an embodiment, error counts retrieved from the network devices can be associated with times at which the error counts were retrieved. The error counts and associated times can be used to model changes in counts of errors detected by the network devices over time. Additionally or alternatively, a new error graph can be created for error data retrieved at each specified time interval. In at least one embodiment, the monitoring service 160 can be configured to create the error graph 164 and identify a source of the detected errors when retrieved error counts meet or exceed a specified threshold.

In at least some embodiments, the monitoring service 160 creates the error graph 164 using a network topology (not shown) describing the cut-through network. Such a topology can comprise nodes representing network devices and/or network device ports in the cut-through network. The topology can comprise edges representing connections between the network devices and/or the network device ports. For example, the topology can comprise nodes representing the ports of the network devices 120, 122, and 124; an edge representing the connection between an outbound port of network device 120 and an inbound port of network device 122; and an edge representing the connection between an outbound port of network device 122 and an inbound port of network device 124. In at least some embodiments, the topology can comprise nodes representing the computing devices 110 and 112, and edges representing the connections from the computing devices 110 and 112 and inbound ports of the network device 120.

Creating the error graph 164 can comprise mapping the retrieved error data 162 onto nodes of the network topology. For example, mapping an error datum onto a node in the network topology can comprise associating the error datum with a node in the topology that represents the network device from which the error datum was retrieved. In an embodiment where nodes in the topology represent ports of the network devices, the mapping can comprise associating the error datum with the node for the network device port with which the error datum is associated. The edges in the topology, representing the connections between the inbound and outbound ports of the network devices, can be used to determine a flow of the errors from one network device to another through the cut-through network. The source of the network packets containing the errors can be identified by tracing a path of the detected errors to a node in the topology representing the source device and/or source device port.

The monitoring service 160 can report on the identities of source devices and/or communication links that are sending network packets with errors. For example, upon determining that network packets with errors are originating from computing device 112, the monitoring service 160 can report that computing device 112 is sending network packets with errors. In some implementations, the monitoring service 160 can record results of the error source identification, provide reporting tools, and/or take action based on the results. For example, the monitoring service 160 can instruct network devices to shut one or more ports and/or divert traffic away from a source of the errors. Additionally or alternatively, the monitoring service 112 can instruct network devices to exclude or drop network packets from source devices that are sending network packets with errors.

Figure 2:
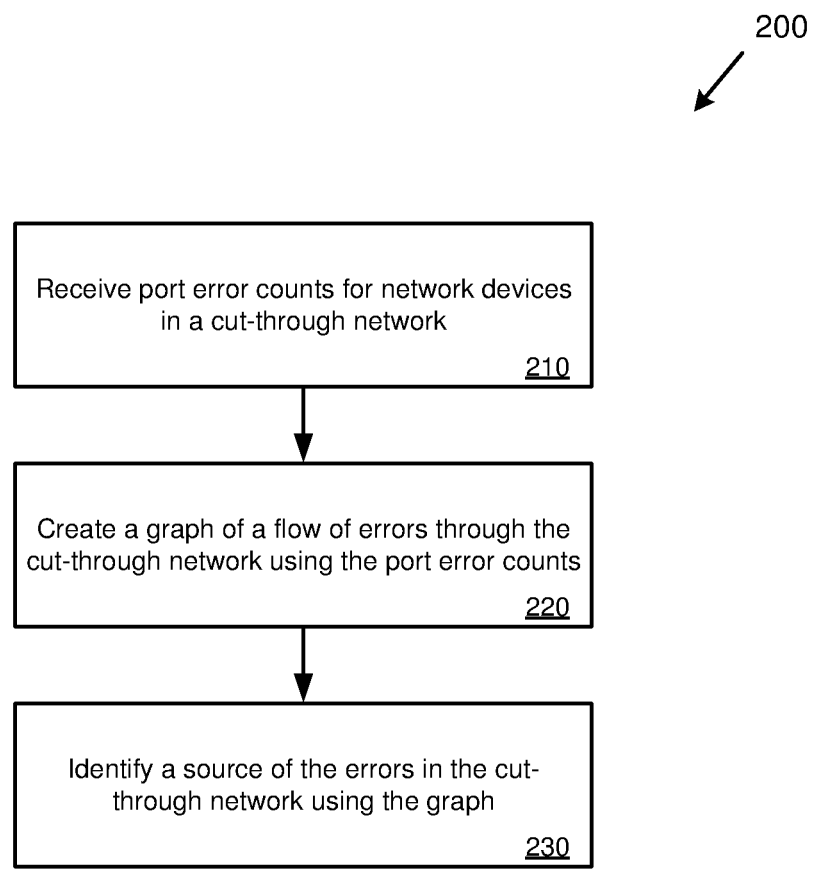
FIG. 2 is a flowchart of an example method for identifying a source of errors in a cut-through computer network.

FIG. 2 is a flowchart of an example method for identifying a source of errors in a cut-through computer network. Any of the example systems described herein can be used to perform the example method 200. For instance, the example method 200 can be performed by a monitoring service or monitoring server as described herein.

At 210, port error counts for network devices in a cut-through network are received. The port error counts comprise counts of errors detected at ports of the network devices. The network devices in the cut-through network can be configured to detect errors in network data received at their inbound ports and transmitted via their outbound ports. Examples of network data include network packets (such as Layer 3 packets or the like) and network frames (such as Layer 2 frames or the like). At least some of the network devices in the cut-through network can be connected to one another via one or more communication channels. For example, ports of the network devices can be connected via communication cables (such as network cables, fiber-optic cables, etc.). These communication channels can be used by the network devices to route network data through the cut-through network. When a network device detects an error in network data (for example by detecting a failed CRC check for a frame), the network device can increment an error counter associated with a network port of the device through which the network data was received or transmitted.

The port error counts for the network devices can be received at a centralized server, such as a monitoring server or the like. In at least some embodiments, the centralized server can be configured to request the port error counts from the network devices. For example, the centralized server can use a polling technique, such as SNMP polling, to request the port error counts from the network devices. Additionally or alternatively, the network devices can be configured to transmit the port error counts to the centralized server. For example, the network devices can be configured to push updated port error counts to the centralized server at specified time intervals (e.g., every thirty seconds, every minute, etc.).

At 220, a graph of a flow of errors through the cut-through network is created using the port error counts. Each of the port error counts can be associated with a network device port identifier which uniquely identifies the network device and network device port with which the error count is associated. For example, the network device port identifier can comprise an Internet Protocol (IP) address of the network device and a port number of the network device port. A node can be created in the graph for each network device port for which an error count was received at 210. Directed edges can be created between the nodes that indicate a flow of the errors between the network devices. In at least some embodiments, the graph can be directed acyclic graph, wherein the graph nodes represent the network devices from which the port error counts are received, and directed edges between the graph nodes represent a path of network packets containing the errors through the network devices.

In at least some embodiments, the graph can be created using a topology of the cut-through network. The port error counts can be associated with the nodes in the topology that represent the network devices in the cut-through network. For example, for each received port error count, the port error count can be associated with a node that represents the network device from which the port error count is received. The topology can comprise edges between the network device nodes, representing connections between the network devices in the cut-through network. These edges can be used to trace the flow of errors through the network devices in the cut-through network. For example, increases in error counts associated with the various nodes in the topology, along with the edges defining the connections between the network devices, can be used to determine a direction in which the errors are flowing through the network devices. In a different or further embodiment, nodes in the topology can represent ports of the network devices and edges between these nodes can represent connections between the ports of the network devices.

In at least some embodiments, the example method 200 can further comprise creating the topology of the cut-through network. For example, descriptions can be associated with ports of the network devices in the cut-through network. These descriptions can identify ports of other network devices to which the ports are connected. For example, each network device port can be associated with a unique identifier (such as a combination of a network device identifier and a port number). A description for a given port can include an identifier for another network device port to which the given port is connected. Other examples of descriptions associated with ports of the network devices include Link Layer Discovery Protocol information (such as port names and/or descriptions), Address Resolution Protocol information (such as Machine Access Control addresses), L2 Content Addressable Memory table entries, etc.

The identifiers and associated descriptions for the ports of the network devices in the cut-through network can be retrieved and used to construct the topology. For example, a topology node can be created for each network port identifier. Then the descriptions (which contain identifiers for ports to which the associated ports are connected) can be used to create edges between the network port nodes in the topology.

At 230, a source of the errors in the cut-through network is identified using the graph. The edges in the graph representing the flow of errors between the network devices can be used to traverse the graph and identify a node in the graph that is associated with a first network device at which the errors were detected. For example, a network device (or network device port) can be determined to be a source of errors if the graph indicates that errors were detected at the network device (or network device port) and no errors were transmitted to the network device (or network device port).

In at least some embodiments, receiving the port error counts at 210 comprises receiving port error counts from the network devices at periodic intervals of time. In such an embodiment, identifying the source of the packet errors at 230 can comprise detecting an increase over time in a port error count for one of the network devices. For example, if an error count associated with a first network device increases, and then at a subsequent time interval an error count associated with a second network device to which the first network devices connected increases, it can be determined that the first network device received and/or generated the errors and subsequently transmitted them to the second network device.

Figure 3:
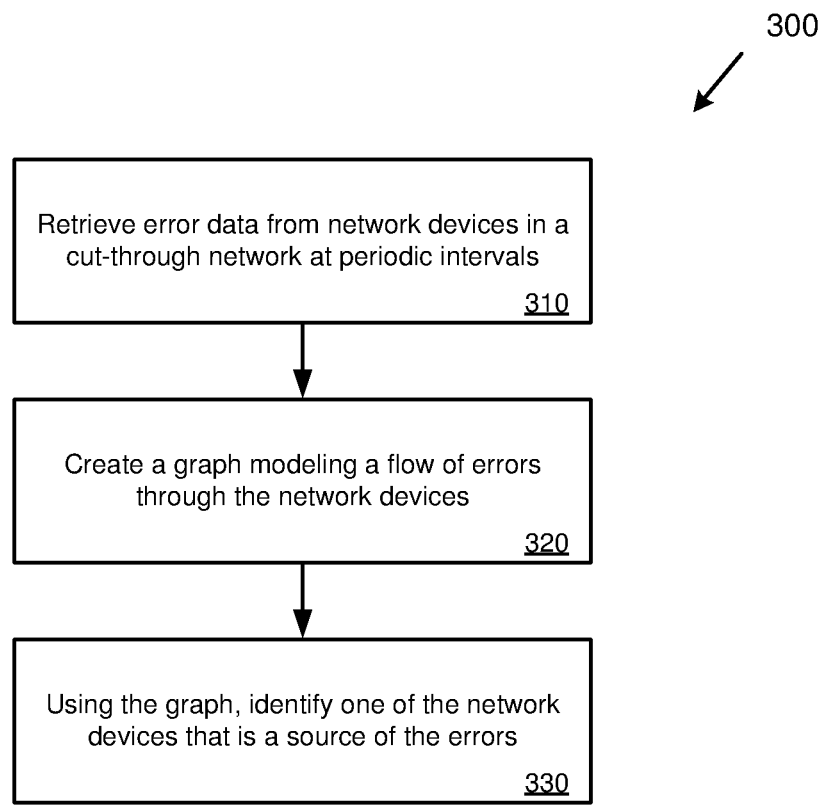
FIG. 3 is a flowchart of another example method for identifying a source of errors in a cut-through computer network.

FIG. 3 is a flowchart of another example method 300 for identifying a source of errors in a cut-through computer network. Any of the example systems described herein can be used to perform the example method 300. For instance, the example method 300 can be performed by a monitoring service or monitoring server as described herein.

At 310, error data is retrieved from network devices in a cut-through network at periodic intervals. A management protocol, such as an SNMP, can be used to retrieve the error data from the network devices. For example, a polling rate can be specified that defines a rate at which the network devices are polled for error data (such as by using SNMP polling or the like).

The error data can comprise counts of errors associated with network interfaces of the network devices. In at least some embodiments, the network devices can be configured to update the error counts when network packets containing errors are received and/or transmitted at the network interfaces. For example, each of the network devices can be configured to use CRC checks to detect corruption in packets received at their interfaces and to detect corruption in packets transmitted at their interfaces.

The network devices can be configured to update the counts of detected errors associated with their network interfaces at specified rates. In at least some scenarios the rate at which a given network device updates its error counts can be specified by a vendor and/or manufacturer of the network device. Thus, the updated error counts can be retrieved from the network devices at periodic intervals that are a function of a polling rate at which the network devices are polled for error data, and the update rate at which the network devices are configured to update the error counts.

At 320, a graph modeling a flow of errors through the network devices is created. The graph is created using error data retrieved at 310 and associated time intervals at which the error data were retrieved. In an embodiment where the error data comprises error counts associated with interfaces of the network devices, the error counts can be used to create vertices in the graph representing the network device interfaces. For example, if an error count for a given interface exceeds a specified threshold (and/or is increasing at a rate that exceeds a specified threshold rate), a vertex can be made in the graph that represents the given interface. After the network device interface vertices have been added to the graph, edges can be created between the vertices, which represent a flow of errors through the network device interfaces. For example, for a given network device interface vertex, a directed edge can be created connecting the given vertex to another vertex representing another network device interface to which network packets containing errors were transmitted. The time intervals associated with the error counts can be used to identify a direction of the flow of the errors. For example, if an error count for one network device increases during one time interval, and an error count for an adjacent network device increases during a subsequent time interval, it can be determined that a likely direction of the flow of errors is from the one network device to the adjacent network device.

In at least some embodiments, a topology of the cut-through network can be used to create the graph modeling the flow of errors through the network devices. The topology can comprise vertices representing interfaces of the network devices in the cut-through network, and edges representing connections between the interfaces of the network devices. The error data can be mapped to vertices in the topology, representing interfaces of the network devices in the cut-through network. For example, error counts associated with the network device interfaces can be mapped to corresponding vertices representing the network device interfaces. The edges between the vertices in the topology can then be used to identify connections between the network device interfaces, through which the errors traveled.

In at least some embodiments, the topology of the cut-through network can be created using interface descriptions associated with the interfaces of the network devices. For example, an interface description associated with a given network interface of a network device can identify another network interface of another network device to which the given network interface is connected. The network interface descriptions can be retrieved from the network devices and used to create the topology of the cut-through network. In at least one embodiment, each network device interface is associated with a unique identifier and a description that comprises a unique identifier of another network device interface to which the network device interface is connected. For a given network device interface, a vertex can be created in the topology and associated with the unique identifier for the given vertex. An edge can then be created in the topology to connect the created vertex to another vertex associated with the network device interface identifier contained in the given vertex's description.

At 330, one of the network devices that is a source of the errors is identified using the graph. The edges of the graph can be traversed to identify a network device interface that is a first network device interface at which the errors were detected. In an embodiment where the graph is created using a topology of the cut-through network, the connections between the vertices in the topology can be used to trace a path of the errors to an originating network device. For example, the connections between the vertices representing network device interfaces at which errors were detected can be used to determine a path traveled by the errors through the cut-through network. In at least some embodiments, changes in the retrieved error counts over time can be used to infer a direction in which the errors traveled. For example, if an error count for a first network device interface increases at a given point in time, and then an error count associated with a second network device interface to which the first network device is connected increases at a second point in time, it can be determined that the errors traveled from the first network device interface to the second network device interface. A network device interface that is thus determined to be a first network device interface at which the errors were detected can be identified a source of the errors.

Figure 4:
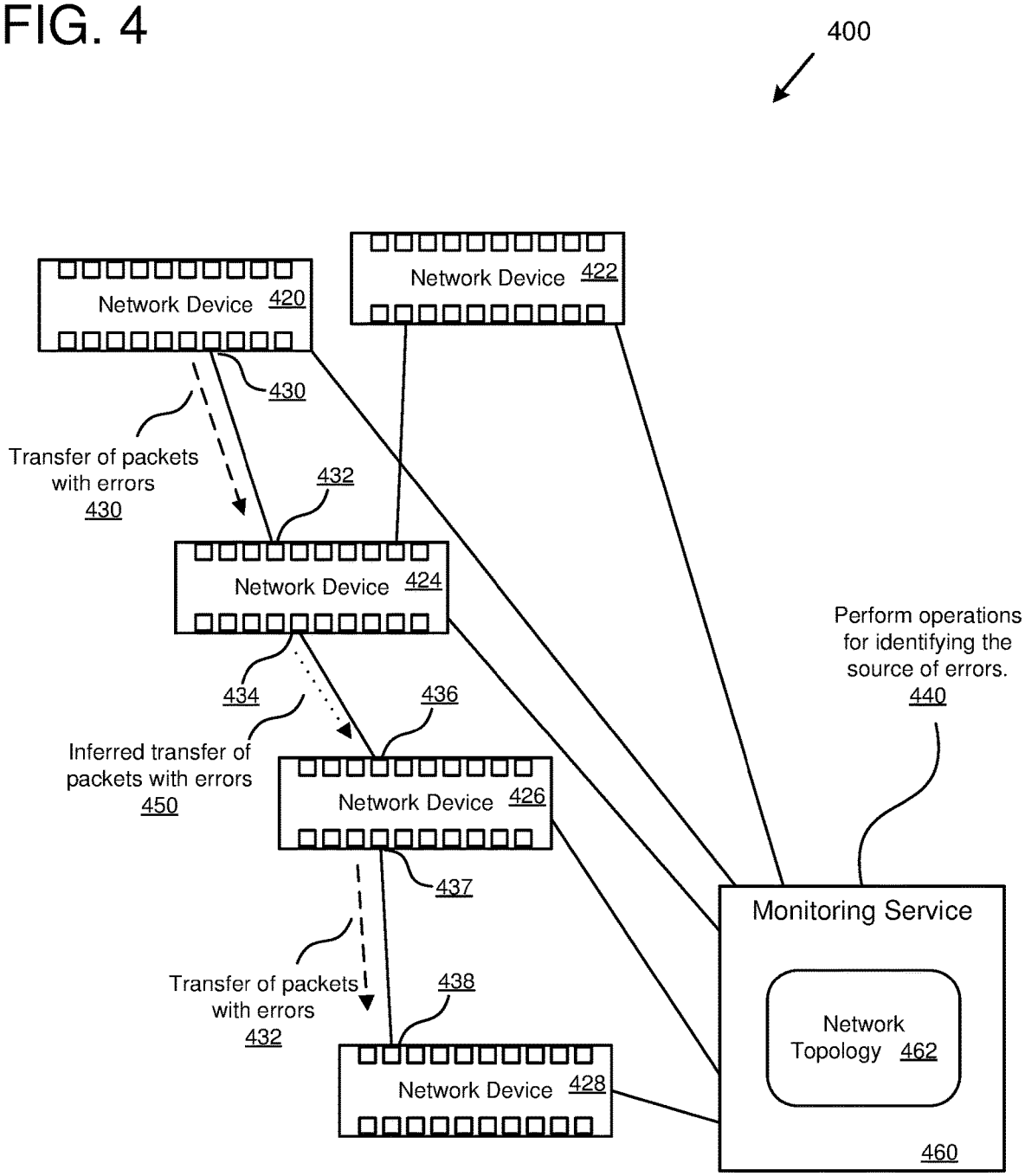
FIG. 4 is a system diagram depicting an example system comprising a monitoring service that performs operations for inferring a source of errors in a cut-through network.

FIG. 4 is a system diagram depicting an example system 400 comprising a monitoring service 460 that performs operations for inferring a source of errors in a cut-through network. FIG. 4 is a simplified diagram that only depicts a few devices and network connections for ease of illustration. A real-world computing environment may contain many more computing devices, network devices, network connections and network fabrics, and other computing resources.

In FIG. 4, five example network devices 420-428 are depicted. For example, the network devices 420-428 can be switches, routers, or other types of networking equipment that process network packets. The network devices 420-428 can be part of a larger network of a business or organization (e.g., part of a data center network that can comprise network fabrics, such as multi-tiered network fabrics). The network devices 420-428 each have a number of network ports (e.g., 430-438) for connecting to computing devices or other network devices. In FIG. 4 a number of example network links are depicted. Specifically, network devices 420 and 422 are connected to network device 424, network device 424 is connected to network device 426, and network device 426 is connected to network device 428. The connections between the ports of the network devices may be wired communication cables, such as wired Ethernet cables, fiber optic cables, etc.

In FIG. 4, network devices 420-428 process network packets using cut-through forwarding (e.g., cut-through forwarding is enabled on all network ports of network devices 420-428). Therefore, network device 420 will begin transmitting a network packet it receives to network device 422 before the complete network packet has been received by network device 420. Network device 422 will do the same thing, as will network devices 424, 426, and 428.

The network devices 420-428 are connected to a monitoring service 460. The monitoring service can comprise one or more hardware and/or software components of one or more computing devices. In at least some embodiments, the monitoring service 460 can be implemented as a dedicated monitoring server. The connections between the network devices 420-428 and the monitoring service 460 can comprise wired communication cables. In at least one embodiment, the connections between the management service 460 and the network devices 420-428 and the monitoring service can be part of a management plane of the cut-through network.

As depicted at 440, the monitoring service 460 performs operations for identifying a source of errors in the cut-through network. The monitoring service 460 can receive counts of errors from the network devices 420-428. The counts of errors can be associated with network ports of the network devices 420-428. For a given network port, an error count associated with the network port can indicate a number of errors detected in network packets received at, or transmitted through, the network port. The network devices 420-428 can inspect received network packet data and transmitted in network packet data for errors (e.g., by performing CRC checks). The monitoring service 460 can periodically retrieve the error counts from the network devices 420-428 and can use the error counts, in combination with a network topology 462, to identify the source of the errors in the cut-through network.

In identifying the source of the errors in the cut-through network, the monitoring service 460 can infer a flow of errors from one of the network devices to another of the network devices. For example, the monitoring service 460 can identify a flow of errors from a first network device to a second network device, and a flow of errors from a third network device to a fourth network device. In at least some cases, the monitoring service 460 can create an inferred flow of the errors from the second network device to the third network device. Creating the inferred flow of errors from the second network device to the third network device can comprise identifying a connection between an outbound port of the second network device and an inbound port of the third network device, and determining that the identified connection is a probable path of the errors through the cut-through network to the third network device.

Such inference can be advantageous in situations where the monitoring service 460 has incomplete information about the error counts for the network devices 420-428. For example, the monitoring service 460 may receive the error counts from the network devices at periodic intervals. Additionally or alternatively, the network devices 420-428 may be configured to update their respective error counts at different rates. Thus, in some scenarios the monitoring service 460 may have more up-to-date error count information for some of the network devices than for others.

FIG. 4 depicts an example inferred transfer of network packets with errors 450 created by the monitoring service 460. Using error counts received from the network device 420, the monitoring service 460 determines that errors were detected in network packets transferred via port 430 of the network device 420. Using error counts received from the network device 424, the monitoring service 460 determines that errors were detected in network packets received at the port 432 of the network device 424. The monitoring service 460 can use the topology 462 to determine that port 430 of the network device 420 is connected to port 432 of network device 424 and that a transfer of network packets with errors 430 was made from the port 430 to the port 432.

Using error counts received from the network device 426, the monitoring service 460 can determine that errors were detected in network packets transmitted via the port 437 of the network device 426. Using error counts received from the network device 428, the monitoring service 460 can determine that errors were detected in network packets received at the port 438 of the network device 428. The monitoring service 460 can use the topology 462 to determine that the port 437 is connected to the port 438 and that a transfer of network packets with errors 432 was made from the port 437 to the port 438.

Although error counts were not received for the port 434 of the network device 424 or the port 436 of the network device 426, the monitoring service 460 can use the network topology 462 to create the inferred transfer of packets with errors 450 from the port 434 to the port 436. For example, the network topology 462 may indicate that the packets with errors detected at port 437 could only have arrived at the network device 426 from the network device 424. Additionally or alternatively, similarities in the number of detected errors at port 432 and port 437 may indicate that the errors were transmitted from the network device 424 to the network device 426. In a particular embodiment, a hypothesized loss of data on the connection between the network device 424 and 426 can be determined. That loss can be weighted by a given heuristic (such as a number of hops between the network devices). The existence of the loss along such a route to the network can be inferred in order to drive convergence.

Figure 5:
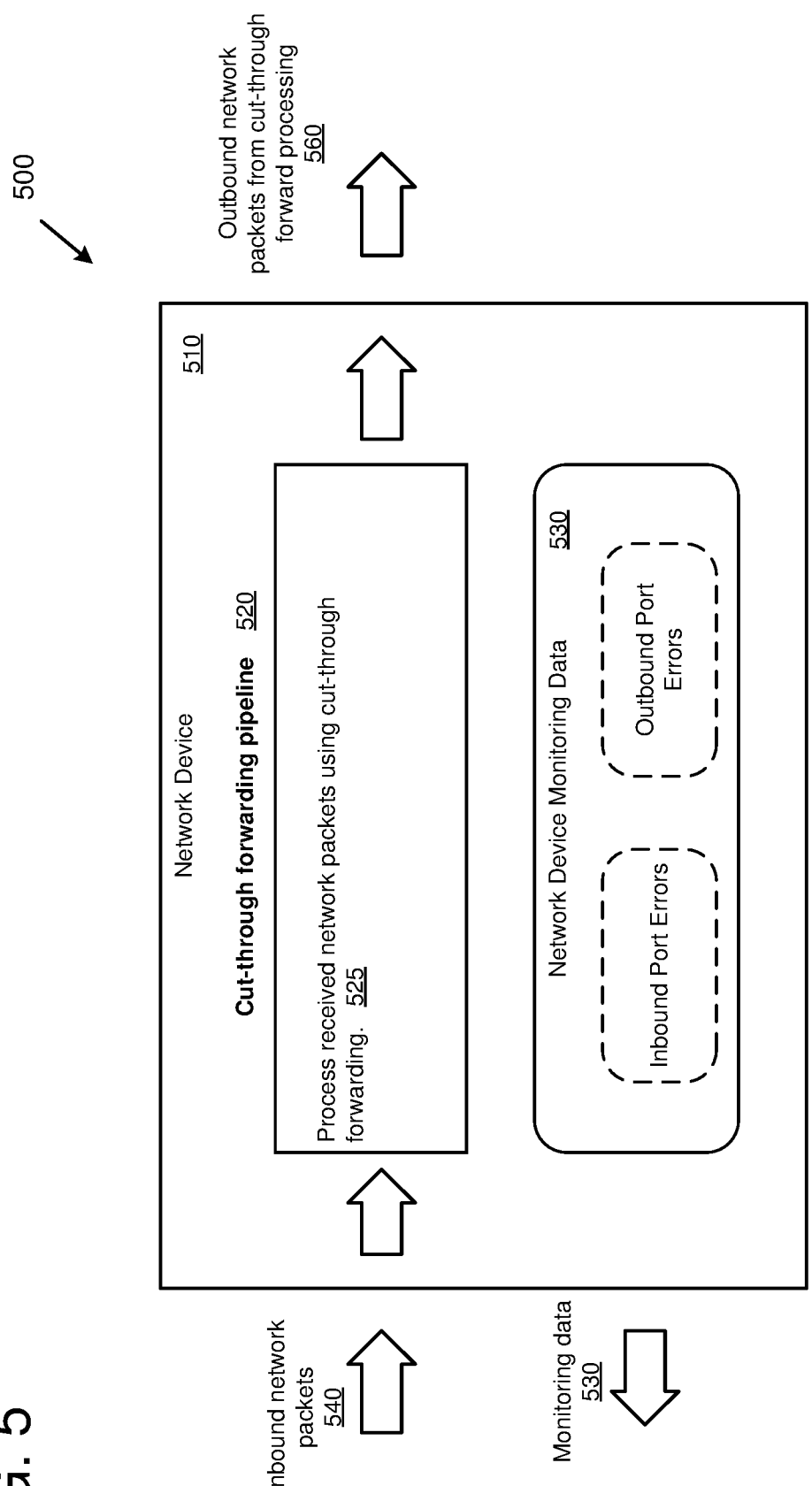
FIG. 5 is a diagram depicting an example network device configured to process network packets using cut-through forwarding.

FIG. 5 is a diagram depicting an example system 500 comprising an example network device 510 configured to process network packets using cut-through forwarding. The network device 510 can be a switch, a router, or another type of network device that processes network packets. As depicted at 540, the network device 510 receives inbound network packets. The inbound network packets are received via network ports of the network device 510. The inbound network packets can be received from other network devices (e.g., from other routers or switches) or from computing devices (e.g., servers, desktop computers, laptop computers, etc.).

The network device 510 processes the received network packets (the inbound network packets depicted at 540) using a cut-through forwarding pipeline 520 (e.g., primary processing pipeline). The cut-through forwarding pipeline 520 processes the received network packets using cut-through forwarding, as depicted at 525. After the received network packets that are processed by the cut-through forwarding pipeline 520, they are forwarded on to their respective destinations, as depicted at 560. The cut-through forwarding pipeline 520 processes a received network packet and forwards it on (e.g., to a next-hop network device or a destination computing device) without waiting for the entire network packet to be received.

The network device 510 records monitoring data 530, including data related to errors detected in the inbound network packets 540 and data related to errors detected in the outbound network packets 560. The data related to the errors can include counts of errors detected in the inbound network packets, and the outbound network packets, respectively. When the network device 510 detects an error (e.g. such as a CRC check failure) in an inbound network packet, a count of inbound port errors in the network monitoring data 530 can be incremented. Additionally or alternatively, when the network device 510 detects an error in an outbound network packets, account of outbound port errors in the network monitoring data 530 can be incremented. In at least some embodiments, the monitoring data 530 comprises separate inbound and outbound port errors for each port of the network device 510.

The network device 510 transmits the monitoring data 530 to a monitoring server. The monitoring data 530 can be transmitted via a network connection between the monitoring server and the network device 510. For example, the monitoring server can be connected to one of the ports of the network device 510. Additionally or alternatively, the monitoring server can be connected to the network device 510 via a management plane.

The monitoring data 530 can be saved in local and/or remote logs (e.g., saved to a local log file or database, provided to a local or remote logging system, etc.). In some implementations, the monitoring data 530 are output as syslog messages to a local log or to a remote logging service. Another way in which the monitoring data 530 can be saved or reported is using SNMP objects. For example, the monitoring data 530 can be transmitted to the monitoring server in response to receipt of an SNMP polling request from the monitoring server.

Figure 6:
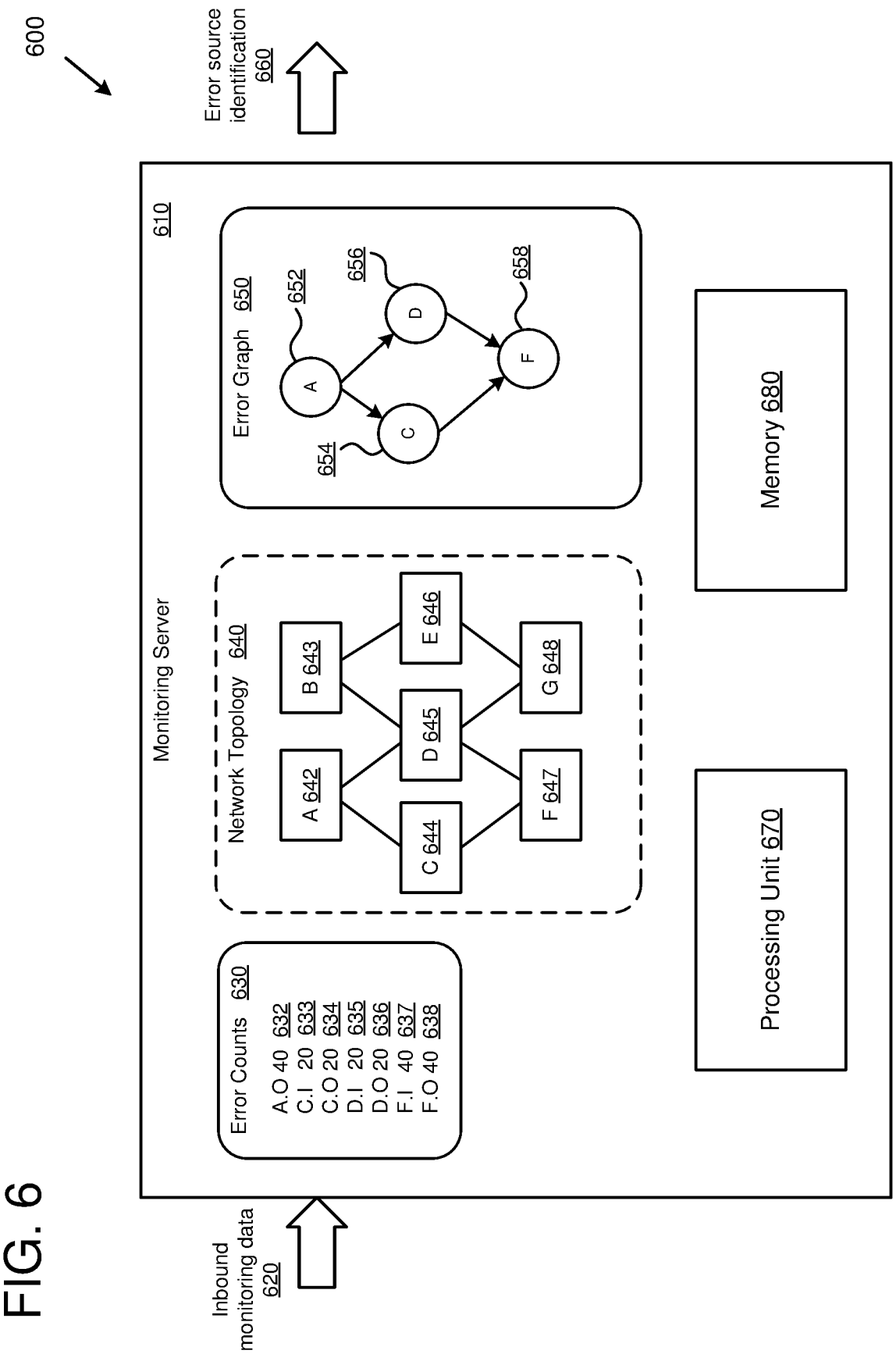
FIG. 6 is a diagram depicting an example monitoring server configured to identify a source of errors within a computer network.

FIG. 6 is a diagram depicting an example monitoring server 610 configured to identify a source of errors within a computer network. The monitoring server 610 comprises at least one processing unit 670 and at least one memory 680.

The monitoring server 610 receives inbound monitoring data 620 from a plurality of network devices in a cut-through network. The monitoring data 620 can be received via one or more connections to the plurality of network devices (for example using SNMP polling). Alternatively, the monitoring data 620 can be received via an externally-accessible interface of the monitoring server 610. For example, the monitoring data 620 can be collected by an application, or network administrator, and uploaded to the monitoring server 610 via an external endpoint (such as a Hyper Text Transfer Protocol endpoint, File Transfer Protocol endpoint, etc.).

In FIG. 6, the monitoring server 610 is depicted as receiving monitoring data from network devices 642-648 in a cut-through network. However, this number of network devices as provided for illustration purposes and is not intended to be limiting.

The monitoring server 610 uses the monitoring data 620 to update inbound and outbound error counts 630 for the network devices in the cut-through network. Error count 632 indicates that forty errors have been detected in network packets transferred from network device 642. Error count 633 indicates that twenty errors have been detected in network packets received at network device 644. Error count 634 indicates that twenty errors have been detected in network packets transferred from network device 644. Error count 635 indicates that twenty errors have been detected in network packets received at network device 645. Error count 636 indicates that twenty errors have been detected in network packets transferred from network device 645. Error count 637 indicates that forty errors have been detected in network packets received at the network device 647. Error count 638 indicates that forty errors have been detected in network packets transferred from the network device 647.

Although the example error counts 632-638 are associated with the network devices, it is also possible to associate error counts with separate ports of the network devices, provided the monitoring data 620 includes error data reported at a network port level.

The monitoring server 610 creates an error graph 650 using the error counts 632 model a flow of the errors through the network devices in the cut-through network. The error graph comprises nodes representing network devices for which there are error counts in 630. For example, the error graph 650 comprises nodes 652, 654, 656, and 658; which correspond to network devices 642, and 644, 645, and 647, respectively. The monitoring server 610 creates directed edges in the error graph 650 that represent a flow of the errors through the network devices.

The monitoring server 610 uses the error graph 650 to identify a source of the errors in the cut-through network. For example, the edges connecting the nodes 652-658 indicate that errors detected at the network device 647 were received from the network device 654 and the network device 656. The errors detected at the network device 654 were received from the network device 652, as where the errors detected at the network device 656. Thus, based on the error graph 650, the monitoring server 610 can determine that the network device 652 (or a port of the network device 652) is a likely source of the errors in the cut-through network. Monitoring server 610 then reports the error source identification 660.

Optionally, the monitoring server 610 can comprise a topology 640 of the cut-through network. The monitoring server 610 can use the network topology 640 in conjunction with the error counts 630 in constructing the error graph 650. For example, the monitoring server 610 can use the topology 640 to identify connections between the network devices, and thereby construct a probable route of errors through the network. For example, monitoring server 610 can use the error counts 632, 633, and 635 to determine that forty errors were transmitted by the network device 642, that twenty errors were received by the network device 633, and that twenty errors were received by the network device 645. Using the topology 640, the monitoring server 610 can determine that the network device 642 is connected to the network device 644 and the network device 645. Given the fact that the network device 642 is connected to the network devices 644 and 645, and the fact that the total number of errors received by the network devices 644 and 645 is equal to the number of errors transmitted by the network device 642, the monitoring server 610 can conclude that the errors received by the network devices 644 and 645 were received from the network device 642. Similarly, using the network topology 640 and error counts 634, 636, and 637, the monitoring server 610 can determine that the errors received by the network device 647 were received from the network devices 644 and 645.

In at least one embodiment, the topology 640 is provided to the monitoring server 610 along with the monitoring data 620. For example, the monitoring data 620 and the topology 640 can be received via an externally-accessible interface of the monitoring server 610.

Figure 7:
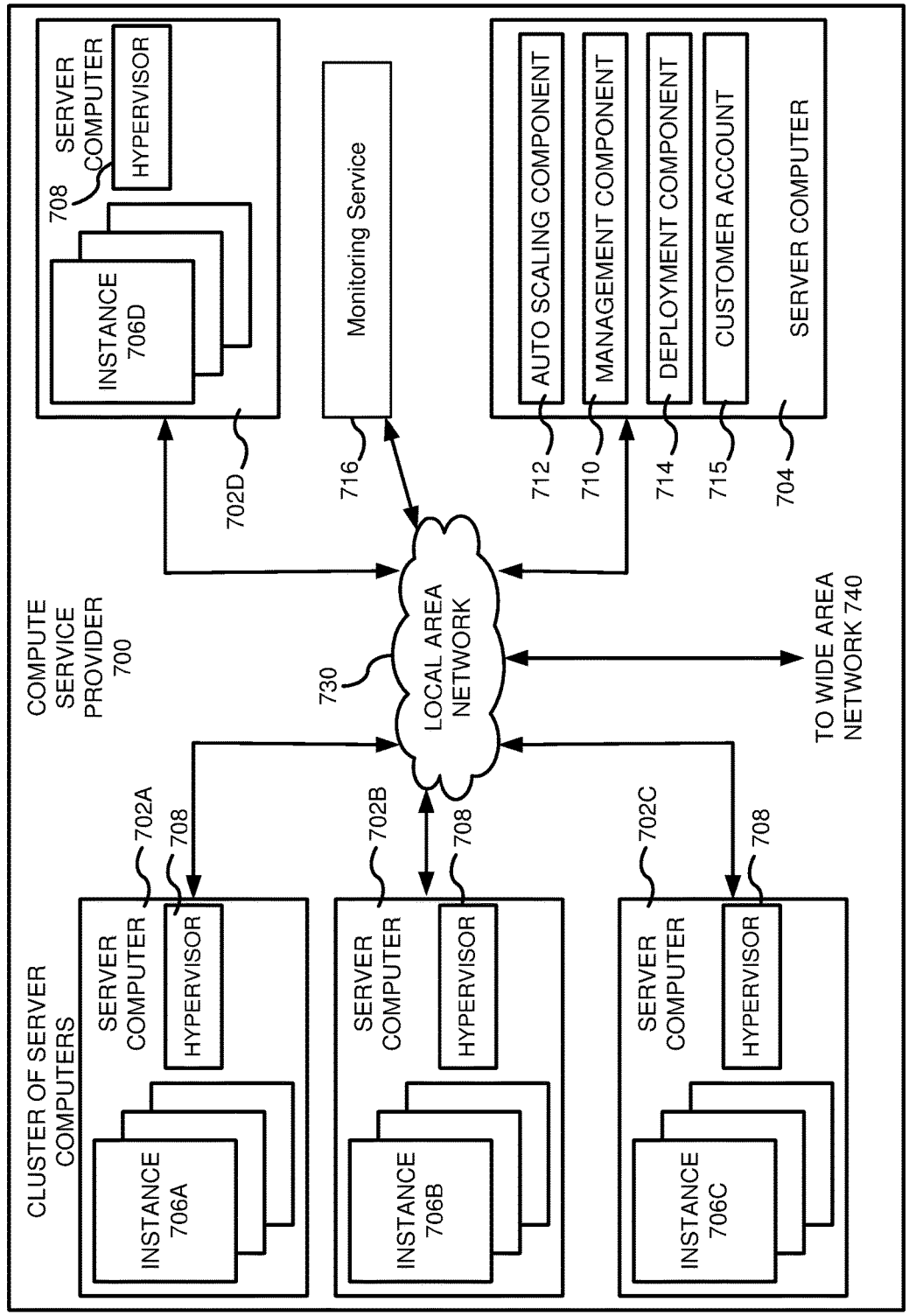
FIG. 7 is an example system diagram depicting a plurality of virtual machine instances running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can comprise Clos networks or other types of multi-tiered network fabrics. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and network devices can be utilized to interconnect the various computing systems disclosed herein.

A monitoring service 716 performs operations for identifying the source of errors within the computer network (e.g., within the local area network 730, which can include various types of networks and network fabrics) of the compute service provider 700, and can be organized as a cut-through network wherein at least some of the network devices route packets using cut-through forwarding. The monitoring service 716 can receive error data from the network devices. The error data can be generated by the network devices in response to detecting errors in network packets processed using cut-through forwarding. The monitoring service 716 can use the error data to create a graph which models a flow of the network packets containing errors through the computer network. The monitoring service 716 can use the graph to identify a source of the network packets containing the errors in the computer network. In at least some embodiments, once a device or communication link is identified as the source of the errors, the network traffic can be re-routed to avoid the identified device or link.

Figure 8:
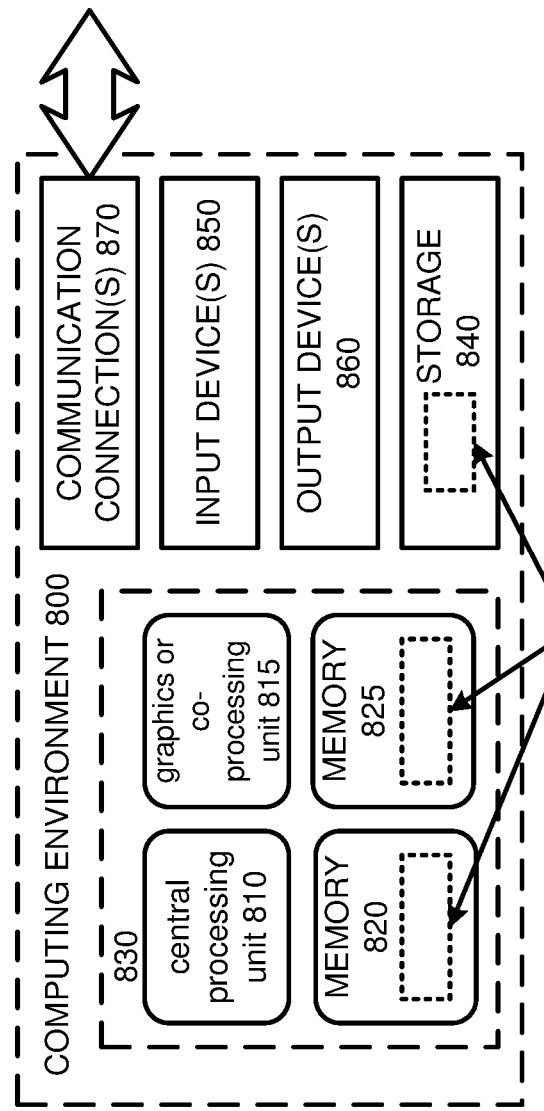
FIG. 8 is a diagram depicting a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

In at least some embodiments, the computing environment 800 can be used as a computing device, network device, or monitoring server as described herein.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein. In at least some embodiments, the tangible storage 840 can comprise one or more storage devices as described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
   a plurality of network switches, wherein the plurality of network switches are connected in a cut-through network and the plurality of network switches perform operations, the operations comprising:
      receiving network packets at inbound network ports of the network switches,
      processing the received network packets and transferring the network packets on outbound network ports of the network switches using cut-through forwarding,
      detecting errors in the received network packets, and
      storing error data associated with the detected errors; and
   a monitoring server, wherein the monitoring server performs operations, the operations comprising:
      retrieving the error data from the plurality of network switches,
      based on the retrieved error data, creating a directed acyclic graph modeling a flow of the errors through the cut-through network, and
      using the directed acyclic graph to identify a source device in the cut-through network that originated the network packets containing the errors.

2. The system of claim 1, wherein the detected errors in the received network packets comprise cyclic redundancy check errors.

3. The system of claim 1, wherein:
   the detecting errors in the received network packets comprises, for a network switch, of the network switches:
      detecting errors in network packet data received at an inbound network port of the network switch, and
      detecting errors in network packet data transferred at an outbound port of the network switch; and
   the storing error data associated with the detected errors comprises:
      storing a count of the errors in the network packet data received at the inbound network port of the network switch, and
      storing a count of the errors in the network packet data transmitted at the outbound port of the network switch.

4. The system of claim 1, wherein:
   the creating the directed acyclic graph modeling a flow of the errors through the cut-through network comprises mapping the retrieved error data onto nodes in a network topology describing the cut-through network, wherein mapping an error datum, of the error data, comprises associating the error datum with a node in the network topology representing a network switch, of the network switches, from which the error datum was retrieved; and
   the using the directed acyclic graph to identify a source device that originated the network packets containing the errors comprises using connections between the nodes in the topology, representing connections between the network switches in the cut-through network, to trace a path of the errors to a node in the topology representing the source device.

5. The system of claim 1, wherein the retrieving the error data associated with the detected errors from the plurality of network switches comprises retrieving error data from the plurality of network switches at specified time intervals over a period of time.

6. A monitoring system comprising a monitoring server, the monitoring server comprising:
   one or more processing units; and
   a memory storing instructions that, when executed by the one or more processing units, cause the monitoring server to perform operations, the operations comprising:
      receiving port error counts for network devices in a cut-through network;
   creating a graph of a flow of errors through the cut-through network using the port error counts, wherein the creating the graph of the flow of errors through the cut-through network comprises:
      associating the port error counts with nodes in a topology of the cut-through network, wherein the nodes in the topology represent the network devices in the cut-through network and the port error counts are associated with the nodes representing the network devices from which the port error counts are received, and
      using edges between the nodes in the topology, representing connections between the network devices in the cut-through network, to trace the flow of the errors through the network devices in the cut-through network; and
   identifying a source of the errors in the cut-through network using the graph.

7. The monitoring system of claim 6, wherein the errors comprise cyclic redundancy check errors on one or more Layer 2 frames.

8. The monitoring system of claim 6, wherein the port error counts comprise counts of errors in network data detected at inbound ports and outbound ports of the network devices.

9. The monitoring system of claim 6, wherein the operations further comprise creating the topology of the cut-through network using descriptions associated with ports of the network devices.

10. The monitoring system of claim 6, wherein the tracing the flow of the errors through the network devices comprises:
   identifying a flow of errors from a first network device to a second network device;
   identifying a flow of the errors from a third network device to a fourth network device; and
   creating an inferred flow of the errors from the second network device to the third network device.

11. The monitoring system of claim 10, wherein the creating the inferred flow of errors from the second network device to the third network device comprises:
   identifying a connection between a port of the second network device and a port of the third network device; and
   determining that the identified connection is a probable path of the errors.

12. The monitoring system of claim 6, wherein:
   the operations further comprise polling the network devices using a simple network management protocol (SNMP); and
   receiving the port error counts from the network devices responsive to the SNMP polling.

13. The monitoring system of claim 6, wherein:
   the receiving the port error counts from the network devices in the cut-through network comprises receiving port error counts at periodic intervals of time; and
   the identifying the source of the packet errors in the cut-through network comprises detecting an increase over time in a port packet error count for one of the network devices.

14. The monitoring system of claim 6, wherein the graph is a directed acyclic graph comprising:
   graph nodes representing the network devices from which the port error counts are received; and
   directed edges between the graph nodes representing a path of network packets containing the errors through the network devices.

15. A method, comprising:
   retrieving error data from network devices in a cut-through network at periodic time intervals;
   using the error data and associated time intervals to create a graph modeling a flow of errors through the network devices in the cut-through network, wherein the creating comprises mapping the error data to vertices in a topology of the cut-through network; and
   identifying a network device, of the network devices in the cut-through network, that is a source of the errors, using the graph, wherein the using the graph comprises using edges between the vertices in the topology, to which the error data are mapped, to trace a path of the errors to an originating network device.

16. The method of claim 15, further comprising:
   creating the topology using interface descriptions associated with network interfaces of the network devices, wherein an interface description associated with a network interface of a network device identifies another network interface of another network device to which the interface is connected.

17. The method of claim 15, wherein the error data comprises counts of errors associated with network interfaces of the network devices.

18. The method of claim 15, wherein the errors comprise cyclic redundancy check errors.

* * * * *